US011507421B2

(12) United States Patent
Chan et al.

(10) Patent No.: US 11,507,421 B2
(45) Date of Patent: Nov. 22, 2022

(54) INFORMATION HANDLING SYSTEM AND METHOD TO ALLOCATE PERIPHERAL COMPONENT INTERCONNECT EXPRESS (PCIE) BUS RESOURCES

(71) Applicant: DELL PRODUCTS L.P., Round Rock, TX (US)

(72) Inventors: Chih-Yu Chan, Zhonghe District (TW); Terry Matula, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 441 days.

(21) Appl. No.: 16/438,062

(22) Filed: Jun. 11, 2019

(65) Prior Publication Data

US 2020/0394076 A1 Dec. 17, 2020

(51) Int. Cl.
| | |
|---|---|
| *G06F 13/14* | (2006.01) |
| *G06F 9/50* | (2006.01) |
| *G06F 13/42* | (2006.01) |
| *G06F 9/4401* | (2018.01) |
| *G06F 11/22* | (2006.01) |

(52) U.S. Cl.
CPC .......... *G06F 9/5022* (2013.01); *G06F 9/4411* (2013.01); *G06F 11/2284* (2013.01); *G06F 13/4282* (2013.01); *G06F 2213/0026* (2013.01)

(58) Field of Classification Search
CPC .. G06F 9/5022; G06F 9/4411; G06F 11/2284; G06F 13/4282; G06F 2213/0026; G06F 9/5061

USPC ......................................................... 710/305
See application file for complete search history.

(56) References Cited

U.S. PATENT DOCUMENTS

| | | | | |
|---|---|---|---|---|
| 5,935,228 | A * | 8/1999 | Shinomura | G06F 9/4411 710/302 |
| 6,539,473 | B1 * | 3/2003 | Hubacher | G06F 9/4416 709/219 |
| 6,754,817 | B2 * | 6/2004 | Khatri | G06F 9/4411 710/301 |
| 8,502,827 | B1 * | 8/2013 | Herz | G06Q 30/0241 345/611 |
| 2005/0038986 | A1 * | 2/2005 | Agan | G06F 9/4411 713/2 |
| 2006/0168377 | A1 | 7/2006 | Vasudevan et al. | |

(Continued)

*Primary Examiner* — Chun Kuan Lee
(74) *Attorney, Agent, or Firm* — Egan, Enders & Huston LLP.

(57) ABSTRACT

Information handling systems (IHSs) and methods are provided herein to allocate Peripheral Component Interconnect Express (PCIe) bus resources to a plurality of PCIe slots according to various PCIe bus resource allocation option settings. At least one host processor is included within the IHS for executing program instructions to detect a PCIe bus allocation option setting selected from a plurality of options provided in a boot firmware setup menu; determine if the PCIe bus allocation option setting has changed since the IHS was last booted; and allocate PCIe bus resources to the plurality of PCIe slots according to the detected PCIe bus allocation option setting. The plurality of options provided in the boot firmware setup menu include at least an auto detect option, which when selected, enables the at least one host processor to automatically detect unused PCIe slots and reallocate PCIe bus resources to used PCIe slots.

22 Claims, 8 Drawing Sheets

(56) References Cited

U.S. PATENT DOCUMENTS

| | | | | |
|---|---|---|---|---|
| 2006/0271713 A1* | 11/2006 | Xie | ............... | G06F 13/4221 |
| | | | | 710/100 |
| 2012/0271978 A1* | 10/2012 | Ahuja | ............... | G06F 13/409 |
| | | | | 710/301 |
| 2013/0058037 A1* | 3/2013 | Brandyberry | ............ | G06F 1/20 |
| | | | | 361/679.46 |
| 2013/0145071 A1* | 6/2013 | Chu | ............... | G06F 13/4022 |
| | | | | 710/313 |
| 2013/0159582 A1* | 6/2013 | Tongen | ............... | G06F 13/4045 |
| | | | | 710/300 |
| 2015/0154033 A1* | 6/2015 | Qu | ............... | G06F 9/4416 |
| | | | | 713/2 |
| 2015/0324312 A1* | 11/2015 | Jacobson | ............ | G06F 13/4221 |
| | | | | 710/104 |

* cited by examiner

FIG. 6

| | CPU | Port | Connector | Default | | Auto - Slot 4 is Unused | | Auto - Slot 2 is Unused | | Auto - Slot 6 is Unused | | Auto - Slot 7 is Unused | |
|---|---|---|---|---|---|---|---|---|---|---|---|---|---|
| | | | | Starting Bus | buses | Starting Bus | buses | Starting Bus | buses | Starting Bus | buses | Starting Bus | buses |
| Information Handling System #1 DUAL CPU | 0 | 0 | CPU0, PCH, SLOT3, SLOT5 | 0 | 22 | 0 | 22 | 0 | 22 | 0 | 22 | 0 | 22 |
| | 0 | 1 | SLOT4 | 22 | 46 | 22 | 2 | 22 | 58 | 22 | 62 | 22 | 62 |
| | 0 | 2 | SLOT1, PCIE0, PCIE1 | 68 | 46 | 24 | 46 | 80 | 46 | 84 | 46 | 84 | 46 |
| | 0 | 3 | SLOT2 | 114 | 46 | 70 | 58 | 126 | 2 | 130 | 62 | 130 | 62 |
| | 0 | | CPU0 total | | 160 | | 128 | | 128 | | 192 | | 192 |
| | 1 | 0 | CPU1 | 160 | 5 | 128 | 5 | 128 | 5 | 192 | 5 | 192 | 5 |
| | 1 | 1 | SLOT6 | 165 | 44 | 133 | 60 | 133 | 60 | 197 | 2 | 197 | 54 |
| | 1 | 2 | PCIE0, PCIE1 | 209 | 3 | 193 | 3 | 193 | 3 | 199 | 3 | 251 | 3 |
| | 1 | 3 | SLOT7 | 212 | 44 | 196 | 60 | 196 | 60 | 202 | 54 | 254 | 2 |
| | 1 | | CPU1 total | | 96 | | 128 | | 128 | | 64 | | 64 |
| | | | system total | | 256 | | 256 | | 256 | | 256 | | 256 |

| CPU Bus Ratio | | | | | | | | | | | | | |
|---|---|---|---|---|---|---|---|---|---|---|---|---|---|
| | | | CPU 0 | | 5 | | 4 | | 4 | | 6 | | 6 |
| | | | CPU 1 | | 3 | | 4 | | 4 | | 2 | | 2 |

FIG. 7

| | | | | Default | | Auto - Slot 4&6 are Unused | | Auto - Slot 4&7 are Unused | | Auto - Slot 2&6 are Unused | | Auto - Slot 2&7 are Unused | |
|---|---|---|---|---|---|---|---|---|---|---|---|---|---|
| | CPU | Port | Connector | Starting Bus | Bus Allocation | Starting Bus | Bus Allocation | Starting Bus | Bus Allocation | Starting Bus | Bus Allocation | Starting Bus | Bus Allocation |
| Information Handling System #1 DUAL CPU | 0 | 0 | CPU0, PCH, SLOT3, SLOT5 | 0 | 22 | 0 | 22 | 0 | 22 | 0 | 22 | 0 | 22 |
| | 0 | 1 | SLOT4 | 22 | 46 | 22 | 2 | 22 | 2 | 22 | 90 | 22 | 90 |
| | 0 | 2 | SLOT1, PCIE0, PCIE1 | 68 | 46 | 24 | 46 | 24 | 46 | 112 | 46 | 112 | 46 |
| | 0 | 3 | SLOT2 | 114 | 46 | 70 | 90 | 70 | 90 | 158 | 2 | 158 | 2 |
| | | | CPU0 total | | 160 | | 160 | | 160 | | 160 | | 160 |
| | 1 | 0 | CPU1 | 160 | 5 | 160 | 5 | 160 | 5 | 160 | 5 | 160 | 5 |
| | 1 | 1 | SLOT6 | 165 | 44 | 165 | 2 | 165 | 86 | 165 | 2 | 165 | 86 |
| | 1 | 2 | PCIE0, PCIE1 | 209 | 3 | 167 | 3 | 251 | 3 | 167 | 3 | 251 | 3 |
| | 1 | 3 | SLOT7 | 212 | 44 | 170 | 86 | 254 | 2 | 170 | 86 | 254 | 2 |
| | | | CPU1 total | | 96 | | 96 | | 96 | | 96 | | 96 |
| | | | system total | | 256 | | 256 | | 256 | | 256 | | 256 |
| CPU Bus Ratio | | | CPU 0 | | 5 | | 5 | | 5 | | 5 | | 5 |
| | | | CPU 1 | | 3 | | 3 | | 3 | | 3 | | 3 |

Information Handling System #1 — DUAL CPU

| CPU | Port | Connector | Starting Bus | Default buses | Auto - Slot 2&4 are Unused (all x16 Slots of CPU0 are unused) Starting Bus | Auto - Slot 2&4 are Unused buses | Auto - Slot 6&7 are Unused (all x16 Slots of CPU1 are unused) Starting Bus | Auto - Slot 6&7 are Unused buses |
|---|---|---|---|---|---|---|---|---|
| 0 | 0 | CPU0, PCH, SLOT3, SLOT5 | 0 | 22 | 0 | 34 | 0 | 22 |
| 0 | 1 | SLOT4 | 22 | 46 | 34 | 2 | 22 | 78 |
| 0 | 2 | SLOT1, PCIE0, PCIE1 | 68 | 46 | 36 | 58 | 100 | 46 |
| 0 | 3 | SLOT2 | 114 | 46 | 94 | 2 | 146 | 78 |
| 0 |   | CPU0 total |   | 160 | 96 | 96 | 224 | 224 |
| 1 | 0 | CPU1 | 160 | 5 | 96 | 5 | 224 | 5 |
| 1 | 1 | SLOT6 | 165 | 44 | 101 | 76 | 229 | 12 |
| 1 | 2 | PCIE0, PCIE1 | 209 | 3 | 177 | 3 | 241 | 3 |
| 1 | 3 | SLOT7 | 212 | 44 | 180 | 76 | 244 | 12 |
| 1 |   | CPU1 total |   | 96 |   | 160 |   | 32 |
|   |   | system total |   | 256 |   | 256 |   | 256 |
| CPU Bus Ratio |   |   |   |   |   |   |   |   |
|   |   | CPU 0 |   | 5 |   | 3 |   | 7 |
|   |   | CPU 1 |   | 3 |   | 5 |   | 1 |

*FIG. 8*

INFORMATION HANDLING SYSTEM AND METHOD TO ALLOCATE PERIPHERAL COMPONENT INTERCONNECT EXPRESS (PCIE) BUS RESOURCES

FIELD

This invention relates generally to information handling systems (IHSs), and more particularly, to IHSs that include Peripheral Component Interconnect Express (PCIe) slots.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems (IHSs), such as servers, desktop computers and mobile PCs, include Peripheral Component Interconnect Express (PCIe) interfaces and ports for connecting and communicating with PCIe-compatible devices. In some information handling systems, a number of PCIe slots may be included on the system motherboard, along with one or more processing devices (e.g., one or more central processing units (CPUs), GPUs, etc.), a platform controller hub (PCH) and other hardware components. Each PCIe slot included on the motherboard may be configured to receive a PCIe card comprising one or more PCIe devices. Examples of PCIe devices include, but are not limited to, video cards, sound cards, non-volatile memory cards, network interface cards (NICs), hardware RAID controllers, solid state drives (SSDs), graphics processing units (GPUs), etc.

In the PCIe bus architecture, PCIe devices are connected via a network of serial connections called "links" or "buses." A PCIe link (or bus) is a point-to-point communication channel between two PCIe ports and includes one or more "lanes" (e.g., 1, 4, 8, 12, 16 or 32 lanes). Each lane is composed of two differential signal pairs, one for receiving data and the other for transmitting data. PCIe slots and PCIe cards can be configured with 1, 4, 8, 12, 16 or 32 lanes, and are generally designated in terms of lane width using the prefix "x". For example, an "x16 slot" is a PCIe slot comprising 16 lanes, an "x8 slot" is a PCIe slot comprising 8 lanes, etc. Likewise, an "x8 card" is a PCIe card comprising 8 lanes, an "x4 card" is a PCIe card comprising 4 lanes, etc. In general, a PCIe card may fit into a PCIe slot of its physical size or larger. For example, an x8 PCIe card may fit within an x8, x16 or x32 PCIe slot, but will not fit within an x4, or x1 PCIe slot.

FIG. 1 (Prior Art) is a block diagram illustrating an example hierarchy of PCIe devices that may be included within an information handling system (IHS). As shown in FIG. 1, PCIe devices are coupled in a tree topology, and may generally include a PCIe root complex, a PCIe switch, PCI-to-PCI bridge(s) and PCIe end devices. The PCIe root complex logic 12 can be implemented within a host processor 10 of the IHS, and may be used in some embodiments to provide a high speed PCIe connection to a first PCIe end device 14 (e.g., a PCIe-compatible GPU). The root complex logic 12 connects to the PCIe device tree through a logical port (known as the root port), which is connected to a PCIe switch 18 typically implemented, e.g., within a southbridge controller or PCH 16 of the IHS. A PCIe switch is a device that connects two or more PCIe links (or buses) and may contain several virtual PCI-to-PCI bridges. In the example shown in FIG. 1, PCIe switch 18 includes a first virtual PCI-to-PCI bridge 1 connecting PCIe bus 0 to PCIe bus 1, a second virtual PCI-to-PCI bridge 2 connecting PCIe bus 1 to PCIe bus 2, and a third virtual PCI-to-PCI bridge 3 connecting PCIe bus 1 to PCIe bus 3.

Each PCIe link (or bus) may have a number of PCIe end devices and/or PCI-to-PCI bridges connected thereto. A PCIe end device is a PCIe device that terminates a PCIe link, i.e., it only has one connection to the PCIe tree topology. In the example shown in FIG. 1, three PCIe end devices (20, 22, and 24) are coupled to PCIe bus 2, while only one PCIe end device (26) is coupled to PCIe bus 3. A PCI-to-PCI bridge is a PCIe device that connects two PCIe links (or buses) together. In FIG. 1, PCI-to-PCI bridge 28 is included for connecting PCIe bus 3 to PCIe bus 4, where two more PCIe end devices (30 and 32) are connected. In some cases, the PCIe end devices (20, 22, 24, 26, 30 and 32) and PCI-to-PCI bridge(s) (28) may be connected to the system motherboard via PCIe slots, or may be mounted directly onto the system motherboard.

Each time an information handling system (IHS) is powered on or rebooted, an IHS processing device (such as, e.g., the host processor 10 shown in FIG. 1 and/or an embedded controller) executes boot firmware (e.g., BIOS or UEFI) to test and initialize IHS hardware components, perform a Power-On Self-Test (POST) to ensure the hardware configuration is valid and working properly, load an operating system (OS) from a computer readable storage device, and/or perform a variety of other actions known in the art. During POST, all PCIe devices (including PCIe root ports, switches, bridges and end devices) included within the system are detected and enumerated (i.e., assigned bus numbers), so that system software (such as, e.g., the operating system, device drivers, applications, etc.) can address and access the PCIe devices.

The PCIe Specification allows a maximum of 256 bus numbers (or bus resources) to be allocated to the PCIe devices included within an information handling system. While PCIe cards having only one PCI end device (e.g., a NIC, sound card, or USB controller) may consume just one bus number, other PCIe cards (e.g., SSDs, hardware-based RAID controllers, PCIe video cards, Thunderbolt™, PCI-to-PCI bridge devices, etc.) may require many more bus numbers. Also, PCIe cards that support hot-plugging devices (such as Thunderbolt™) require bus numbers to be reserved for devices that may be attached to the system later, after POST is complete and the operating system is running.

Before PCIe devices are detected and enumerated (i.e., assigned bus numbers), the system BIOS allocates various amounts PCIe bus resources to the host processor, PCIe devices and PCIe slots during POST. For example, the system BIOS may allocate a small number of PCIe bus resources to core devices within the host processor, and may allocate or distribute the remaining PCIe bus resources to the PCIe devices and PCIe slots included within the system. In order to do so, the system BIOS may check for the presence of PCI-to-PCI bridges in the PCIe device topology and allocate an optimal number of PCIe bus resources to each PCI-to-PCI bridge (Primary Bus Number/Secondary Bus Number/Subordinate Bus Number) included within the system. The remaining PCIe bus resources would then be distributed relatively evenly to all PCIe slots provided on the system motherboard. In a system comprising 7 PCIe slots, for example, the system BIOS may allocate approximately 35 bus resources to each PCIe slot (if, for example, all PCIe slots have the same lane width).

Although ideal in some cases, distributing PCIe bus resources evenly amongst the PCIe slots may not allow sufficient bus resources to be allocated to some PCIe cards. For example, a dual-port Thunderbolt3 card requires a minimum of 65 bus resources, and therefore, cannot operate properly when only 35 bus resources are allocated to the PCIe slot to which it is connected. Other specialized PCIe cards having, e.g., multiple PCI-to-PCI bridge devices on a single card or a complex hardware design may also require more bus resources, and therefore, fail to operate properly when bus resources are allocated evenly among PCIe slots.

One conventional solution for supporting dual-port Thunderbolt3 and other specialized PCIe cards is to provide a BIOS setup menu that enables users to control how PCIe bus resources are allocated among PCIe slots. In the conventional solution, the BIOS setup menu provided a number of user-selectable PCIe bus allocation options, including a "Default" option, an "Optimize for Thunderbolt" option, and a plurality of "Custom" options. If the "Default" option was selected, the system BIOS allocated bus resources relatively evenly among all PCIe slots. If the "Optimize for Thunderbolt" option was selected, the system BIOS allocated more than 65 bus resources to each PCIe slot configured to support Thunderbolt, and allocated the remaining bus resources evenly to the remaining PCIe slots. If a "Custom" option was selected, the system BIOS allocated a predetermined percentage of bus resources to one or more PCIe slots, while maintaining a minimum or moderate number of bus resources to the remaining PCIe slots.

By providing a BIOS setup menu with user-selectable PCIe bus allocation options, the conventional solution ensured that Thunderbolt3 cards and other specialized PCIe cards had sufficient bus resources to operate properly, and provided flexibility to the user for various scenarios and usage of the PCIe slots. However, the conventional solution did not detect unused PCIe slots and reallocate PCIe bus resources if one or more of the PCIe slots were unused (i.e., if a PCIe card was not connected to one or more of the PCIe slots). As such, the conventional solution did not utilize bus resources optimally when there were unused PCIe slots on the system motherboard.

SUMMARY OF THE INVENTION

The following description of various embodiments of information handling systems and related methods is not to be construed in any way as limiting the subject matter of the appended claims.

According to one embodiment, a computer-implemented method is provided herein to allocate Peripheral Component Interconnect Express (PCIe) bus resources to PCIe slots according to various PCIe bus resource allocation option settings. In general, the computer-implemented method described herein may be executed by a host processor of an information handling system (IHS) having a plurality of Peripheral Component Interconnect Express (PCIe) slots, which are provided on a system motherboard. In some embodiments, the computer-implemented method may be performed each time the IHS is booted, for example, at the start of a Power-On Self-Test (POST).

In one embodiment, the computer-implemented method disclosed herein may include detecting a PCIe bus allocation option setting selected from a plurality of options provided in a boot firmware setup menu, wherein said plurality of options include at least an auto detect option; and determining whether or not the PCIe bus allocation option setting has changed since the IHS was last booted. If the PCIe bus allocation option setting has changed since the last boot, and the auto detect option is detected, the method may further include automatically detecting which of the plurality of PCIe slots are used and unused; releasing PCIe bus resources previously allocated to any PCIe slots determined to be unused; and reallocating the released PCIe bus resources to one or more of the PCIe slots determined to be used.

In some embodiments, said automatically detecting which of the plurality of PCIe slots are used and unused includes determining that a PCIe slot is used upon detecting a device present signal supplied from a pin on the PCIe slot; and determining that the PCIe slot is unused if no device present signal is detected from the pin on the PCIe slot.

In some embodiments, the method may allocate PCIe bus resources relatively evenly to the plurality of PCIe slots, if said automatically detecting determines that each of the plurality of PCIe slots on the system motherboard is used. If one or more of the plurality of PCIe slots are determined to be unused, however, the method may reallocate the released PCIe bus resources to one or more of the used PCIe slots based, at least in part, on at least one of: a number of the host processors included within the IHS, a number of the PCIe slots provided on the system motherboard and a lane width of the PCIe slots. In some embodiments, the method may further include detecting the system motherboard ID to determine the number of host processors included within the IHS, the number of PCIe slots provided on the system motherboard and the lane width of the PCIe slots prior to said reallocating.

If one or more of the plurality of PCIe slots is/are determined to be unused, one embodiment of the method may reallocate the released PCIe bus resources relatively evenly to only the used PCIe slots having a larger lane width. Another embodiment of the method may reallocate a larger amount of the released PCIe bus resources relatively evenly to the used PCIe slots having a larger lane width, while reallocating a smaller amount of the released PCIe bus resources to the used PCIe slots having a comparatively smaller lane width.

In some embodiments, the plurality of options provided in the boot firmware setup menu may further include one or more of: a default option, an optimize for Thunderbolt™ option, and one or more custom options. In some embodiments, the method may further include determining if Thunderbolt™ support is enabled for the IHS prior to said detecting a PCIe bus allocation option setting.

If Thunderbolt support is enabled, the method may further include automatically selecting the optimize for Thunderbolt option; rendering the default option, the auto detect option and the one or more custom options unavailable for user selection in the boot firmware setup menu; and allocating sufficient PCIe bus resources (e.g., at least 65 PCIe bus resources) to the PCIe slots that support Thunderbolt™. The remaining PCIe bus resources may be allocated to the other PCIe slots (i.e., the PCIe slots that do not support Thunderbolt™) based, at least in part, on at least one of: the number of the host processors installed in the system, the number of the PCIe slots provided on the system motherboard and the lane width of the PCIe slots.

If Thunderbolt™ support is disabled, the PCIe bus allocation option setting has changed since the last boot and the auto detect option is not detected, the method may allocate PCIe bus resources to the PCIe slots according to the detected PCIe bus allocation option setting, wherein said allocation is based, at least in part, on at least one of: the number of host processors included within the IHS, the number of PCIe slots provided on the system motherboard and the lane width of the PCIe slots.

According to another embodiment, an information handling system (IHS) is provided herein including a plurality of Peripheral Component Interconnect Express (PCIe) slots provided on a system motherboard, where each PCIe slot is configured to connect to a PCIe end device, and at least one host processor that is coupled to one or more of the PCIe slots. In general, the at least one host processor may be configured to execute: a first set of program instructions to detect a PCIe bus allocation option setting selected from a plurality of options provided in a boot firmware setup menu; a second set of program instructions to determine whether or not the PCIe bus allocation option setting has changed since the IHS was last booted; and a third set of program instructions to allocate PCIe bus resources to the plurality of PCIe slots according to the detected PCIe bus allocation option setting. The plurality of options provided in the boot firmware setup menu include at least an auto detect option, which when selected, enables the at least one host processor to automatically detect unused PCIe slots and reallocate PCIe bus resources to used PCIe slots.

If the PCIe bus allocation option setting has changed since the last boot and the auto detect option is detected, the third set of program instructions may be executed by the host processor to automatically detect which of the plurality of PCIe slots are used and unused; release PCIe bus resources previously allocated to any PCIe slots determined to be unused; and reallocate the released PCIe bus resources to one or more of the PCIe slots determined to be used.

In some embodiments, the IHS may further include a platform controller hub (PCH), which is coupled to the PCIe slots and to the at least one host processor. The PCH may include a plurality of general purpose input/output (GPIO) pins, which are coupled to present pins on the PCIe slots. In some embodiments, the third set of program instructions may determine that a particular PCIe slot is used, if a device present signal is detected via a GPIO pin of the PCH and a present pin of the particular PCIe slot, and may determine that the particular PCIe slot is unused, if no device present signal is detected.

If one or more of the PCIe slots is/are determined to be unused, the third set of program instructions may be executed by the host processor to reallocate the released PCIe bus resources to one or more of the used PCIe slots based, at least in part, on at least one of: the number of the host processors included within the IHS, the number of the PCIe slots provided on the system motherboard and the lane width of the PCIe slots. In some embodiments, the third set of program instructions may be executed by the host processor to reallocate the released PCIe bus resources relatively evenly to only the used PCIe slots having a larger lane width. In other embodiments, the third set of program instructions may be executed by the host processor to reallocate a larger amount of the released PCIe bus resources relatively evenly to the used PCIe slots having a larger lane width, and to reallocate a smaller amount of the released PCIe bus resources to the used PCIe slots having a comparatively smaller lane width.

In some embodiments, the plurality of options provided in the boot firmware setup menu may further include one or more of: a default option, an optimize for Thunderbolt™ option, and one or more custom options. In some embodiments, the at least one host processor may be configured to execute a fourth set of program instructions to determine if Thunderbolt™ support is enabled for the IHS prior to executing the first set of program instructions to detect the PCIe bus allocation option setting.

If Thunderbolt™ support is enabled, the at least one host processor may be configured to execute a fifth set of program instructions to automatically select the optimize for Thunderbolt™ option; render the default option, the auto detect option and the one or more custom options unavailable for user selection in the boot firmware setup menu; and allocate sufficient PCIe bus resources (e.g., at least 65 PCIe bus resources) to the PCIe slots that support Thunderbolt™. The remaining PCIe bus resources may be allocated to the remaining PCIe slots (i.e., the PCIe slots that do not support Thunderbolt™) based, at least in part, on at least one of: the number of the host processors installed in the system, the number of the PCIe slots provided on the system motherboard and the lane width of the PCIe slots.

If Thunderbolt™ support is disabled, the PCIe bus allocation option setting has changed since the last boot and the auto detect option is not detected, the at least one host processor may be configured to execute the third set of program instructions to allocate PCIe bus resources to the PCIe slots according to the detected PCIe bus allocation option setting, wherein said allocation is based, at least in part, on at least one of: the number of the host processors included within the IHS, the number of the PCIe slots provided on the system motherboard and the lane width of the PCIe slots.

BRIEF DESCRIPTION OF THE DRAWINGS

Other advantages of the present disclosure will become apparent upon reading the following detailed description and upon reference to the accompanying drawings in which:

FIG. 6 is a table illustrating a first PCIe bus resource allocation scheme in accordance with the present disclosure;

FIG. 7 is a table illustrating a second PCIe bus resource allocation scheme in accordance with the present disclosure; and FIG. 8 is a table illustrating a third PCIe bus resource allocation scheme in accordance with the present disclosure.

Figure 1:
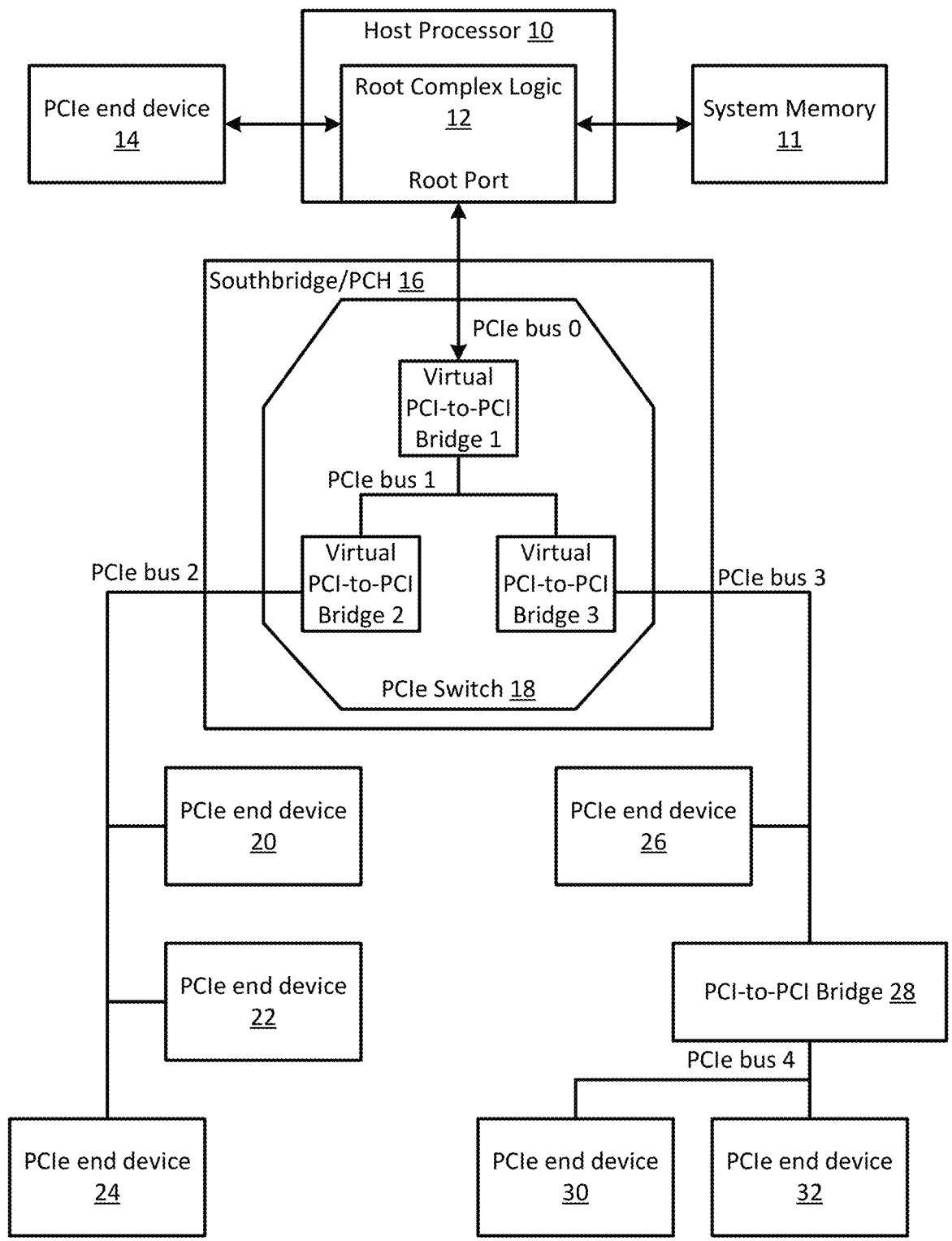
FIG. 1 (Prior Art) is a block diagram illustrating an example hierarchy of Peripheral Component Interconnect Express (PCIe) devices.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

Figure 2:
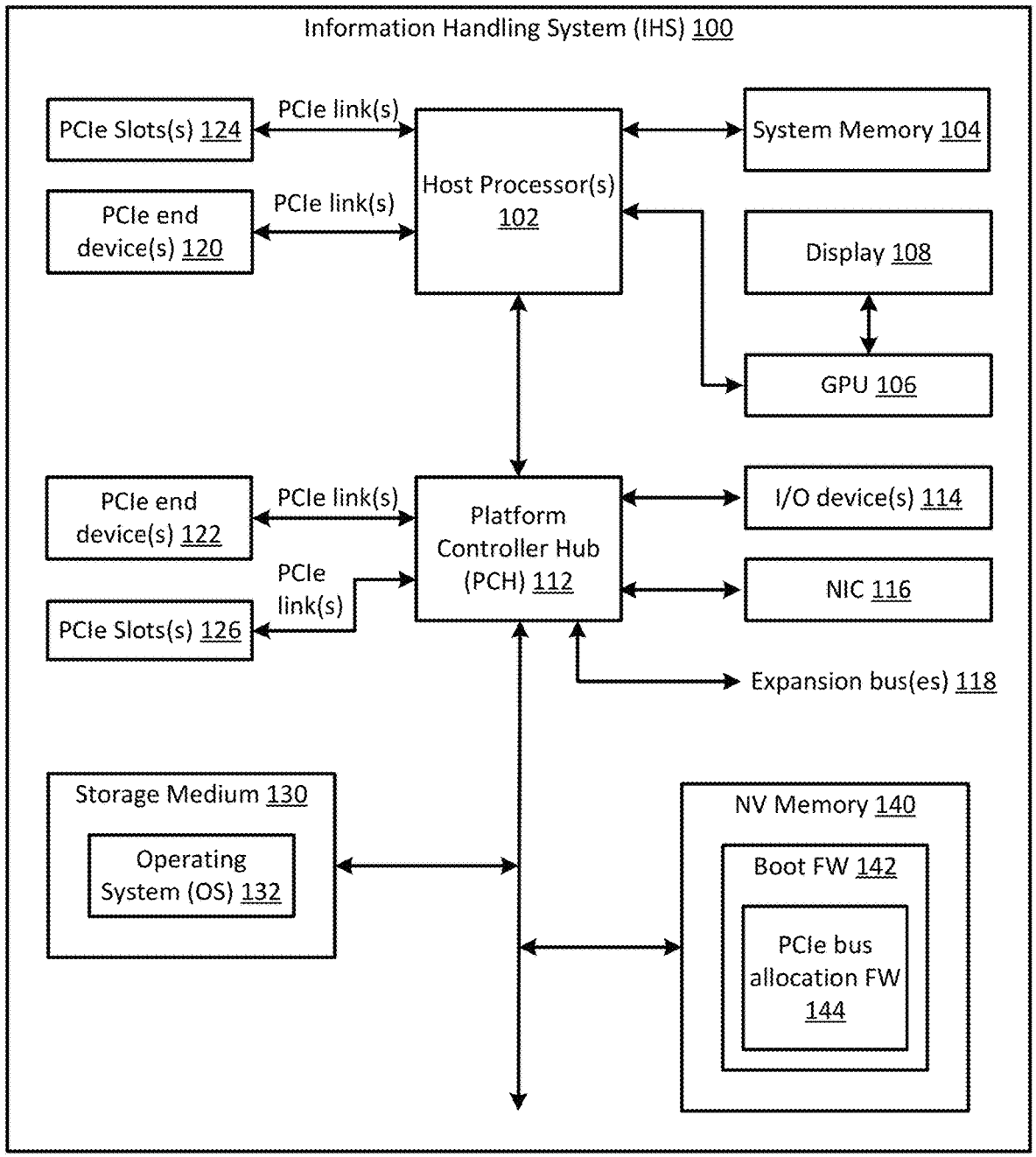
FIG. 2 is a block diagram illustrating one embodiment of an information handling system (IHS) in accordance with the present disclosure, where the IHS includes at least one host processor, a plurality of PCIe slots and PCIe bus allocation firmware, which is executable by the at least one host processor to allocate PCIe bus resources to the plurality of PCIe slots in accordance with a selected PCIe bus resource allocation option setting.

FIG. 2 is a block diagram of an information handling system (IHS) 100 as it may be configured according to one embodiment of the present disclosure. As shown in FIG. 2, IHS 100 may generally include at least one host processor 102, graphics processor unit (GPU) 106, display device 108, system memory 110, platform controller hub (PCH) 112, input/output (I/O) devices 114, network interface card (NIC) 116, expansion bus(es) 118, Peripheral Component Interconnect Express (PCIe) end device(s) 120, 122, a plurality of PCIe slots 124, 126, computer readable storage medium 130, and computer readable non-volatile (NV) memory 140.

As described in more detail below, computer readable NV memory 140 may store PCIe bus allocation firmware 144, which is executable by the at least one host processor 102 to allocate PCIe bus resources to the PCIe slots 124, 126 according to a user-selectable PCIe bus resource allocation option setting.

It is expressly noted that the IHS configuration shown in FIG. 2 is exemplary only, and that the methods disclosed herein may be implemented on any type and/or configuration of information handling system having at least one processing device (e.g., host processor 102, or alternatively, an embedded controller, microcontroller, etc.) for executing PCIe bus allocation firmware 144 to allocate bus resources to a plurality of PCIe slots 124, 126 according to a user-selectable PCIe bus resource allocation option. It will be further understood that while certain components of the information handling system are shown in FIG. 2 for illustrating embodiments of the present disclosure, the information handling system disclosed herein is not restricted to including only those components shown in FIG. 2 and described below.

The at least one host processor 102 shown in FIG. 1 may include various types of programmable integrated circuits (e.g., a processor such as a controller, microcontroller, microprocessor, ASIC, etc.) and programmable logic devices (such as a field programmable gate array "FPGA", complex programmable logic device "CPLD," etc.). According to one embodiment, the at least one host processor 102 may include one or more central processing units (CPUs), each having one or more processing cores. In some embodiments, host processor(s) 102 may include two CPU's, each having one more processing cores. The CPU(s) may include any type of processing device, such as an Intel Pentium series processor, an Advanced Micro Devices (AMD) processor or another processing device. In some embodiments, host processor(s) 102 may be coupled to one or more PCIe end devices 120 via one or more PCIe links. Examples of PCIe end devices 120 that may be coupled to host processor(s) 102 include, but are not limited to CPU storage devices (see, FIG. 5), a PCIe-compatible GPU or a PCIe-compatible solid-state drive (SSD).

System memory 104 is coupled to host processor 102 and generally configured to store program instructions, which are executable by host processor(s) 102. System memory 104 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

GPU 106 is configured to coordinate communication between the host processor(s) 102 and one or more display components of the IHS. In the embodiment shown in FIG. 2, GPU 106 is coupled to display device 108 to provide visual images to the user. In some embodiments, GPU 106 may be configured to display a graphical user interface (e.g., a BIOS setup menu) on display device 108, which enables the user to select (using an input/output device 114) one of a plurality of PCIe bus resource allocation options. Display device 108 may be a display screen embedded within the chassis of the IHS, or an external display screen or monitor coupled to the IHS. In some embodiments, GPU 106 may be further coupled to one or more display ports to support additional display functions for the IHS.

In the embodiment shown in FIG. 2, GPU 106 is illustrated as a separate integrated circuit chip, which is coupled to host processor(s) 102 via a bus. In one alternative embodiment, GPU 106 may be integrated with host processor(s) 102 when host processor 102 is implemented as a silicon-on-chip (SoC) processor. In yet another alternative embodiment, GPU 106 may be implemented as a PCIe end device, which communicates with host processor(s) 102 via a PCIe link coupled, for example, to a PCIe bridge on PCH 112.

Platform controller hub (PCH) 112 is connected to host processor(s) 102 via a direct media interface (DMI). PCH 112 handles I/O operations for the IHS, and thus, may include a variety of communication interfaces, ports and pins for communicating with various IHS components, such as I/O devices 114, NIC 116, expansion bus(es) 118, PCIe end device(s) 122, PCIe slot(s) 124, 126, computer readable storage medium 130, and computer readable NV memory 140.

Examples of communication interfaces, ports and pins that may be included within PCH 112 include, but are not limited to, a Peripheral Component Interconnect (PCI) interface, a PCI-Express (PCIe) interface, a High Speed I/O (HSIO) interface, a Serial Peripheral Interface (SPI), an Enhanced SPI (eSPI), a Serial AT Attachment (SATA) interface, a Direct Media Interface (DMI), a Low Pin Count (LPC) interface, a Small Computer Serial Interface (SCSI), an Industry Standard Architecture (ISA) interface, an Inter-Integrated Circuit ($I^2C$) interface, a Universal Serial Bus (USB) interface, a Thunderbolt™ interface and a number of General Purpose Input/Output (GPIO) pins. Examples of expansion bus(es) 120 that may be coupled to PCH 112 include, but are not limited to, a PCI bus, a PCIe bus, a SATA bus, a USB bus, etc.

I/O devices 114 enable a user to interact with IHS 100. In some embodiments, one or more I/O devices 114 may be present within, or coupled to, IHS 100. In some embodiments, I/O device(s) 114 may be separate from the IHS and may interact with the IHS through a wired or wireless connection. Examples of I/O devices 114 include, but are not limited to, keyboards, keypads, touch screens, scanning devices, voice or optical recognition devices, and any other devices suitable for entering or retrieving data. In some embodiments, a user may use one or more of I/O devices 114 to select one of a plurality of PCIe bus resource allocation options, which are provided within a graphical user interface (e.g., a BIOS setup menu) displayed upon display device 108.

NIC 116 enables IHS 100 to communicate with one or more remote devices, systems and/or services via an external network using one or more communication protocols. The external network may be a local area network (LAN), wide area network (WAN), personal area network (PAN), or the like, and the connection to and/or between IHS 100 and the network may be wired, wireless or a combination thereof. NIC 116 may communicate data and signals to/from IHS 100 using any known communication protocol. In some embodiments, NIC 118 may be implemented as a PCIe end device, which communicates with PCH 112 via a PCIe link.

In the embodiment shown in FIG. 2, PCIe end devices 120 and 122 are connected, via PCIe links, to host processor(s) 102 and PCH 112, respectively. Examples of PCIe end devices 120 and 122 and 124 include, but are not limited to, PCIe video cards, sound cards, small system computer interface (SCSI) controllers, hardware RAID controllers, SSDs, NICs, GPUs, serial/parallel port cards, IEEE 1394 cards, Thunderbolt™ cards, USB controller cards, SATA/eSATA controller cards, PS/2 controller cards, non-volatile memory cards, PCH storage, CPU storage, etc.

In the embodiment shown in FIG. 2, PCIe slots 124 and 126 are connected, via PCIe links, to host processor(s) 102 and PCH 112, respectively. PCIe slots 124 and 126 may include substantially any number of lanes (e.g., 1, 4, 8, 12, or 16), and thus, may be implemented as x1, x4, x8, x12, or x16. In some embodiments, PCIe slots 124 and 126 may have the same lane width (e.g., all PCIe slots may be x16 slots). In other embodiments, PCIe slots 124 and 126 may have different lane widths (e.g., the PCIe slots 124 connected to host processor(s) 102 may comprise x16 slots, and the PCIe slots 126 connected to PCH 112 may comprise x4 slots). In some embodiments, the PCIe slots 124 connected to host processor(s) 102 and/or the PCIe slots 126 connected to PCH 112 may comprise a plurality of lane widths. For example, PCIe slots 124, 126 may comprise a plurality of PCIe slots selected from any combination of x16 slots, x12 slots, x8 slots, etc.

Computer readable storage medium 130 may be any type of persistent, non-transitory computer readable storage medium, such as one or more hard disk drives (HDDs) or solid-state drives (SSDs), and may be generally configured to store software and/or data. In some embodiments, computer readable storage medium 130 may store an operating system (OS) 132 for the IHS, in addition to one or more user applications and data. OS 132 may generally contain program instructions (or computer program code), which may be executed by host processor(s) 102 to perform various tasks and functions for the information handling system and/or for the user. In some embodiments, computer readable storage medium 130 may be implemented as a PCIe-compatible SSD, which communicates with PCH 112 via a PCIe link.

Computer readable memory 140 may include any type of non-volatile (NV) memory including, but not limited to, read-only memory (ROM), flash memory, and non-volatile random access memory (NVRAM), and may be generally configured to store software and/or firmware modules. The software and/or firmware modules stored within computer readable NV memory 140 may generally contain program instructions (or computer program code), which may be executed by host processor(s) 102 to instruct components of IHS 100 to perform various tasks and functions for the information handling system. In the embodiment shown in FIG. 2, NV memory 140 may be generally configured to store boot firmware (FW) 142, in addition to other software and/or firmware modules.

Boot firmware 142 includes software and/or firmware modules for specifying hardware configuration settings, system date/time and boot sequence, etc. In some embodiments, boot firmware 142 may be implemented as a Basic Input/Output System (BIOS) and/or a Unified Extensible Firmware Interface (UEFI). When IHS 100 is initially powered on or rebooted, program instructions within boot firmware 142 may be executed by at least one of host processor(s) 102 to configure hardware components of the IHS, perform a Power-On Self-Test (POST) to ensure the hardware configuration is valid and working properly, discover and initialize devices and launch a bootloader to load OS 132. Once launched, the bootloader within boot firmware 142 retrieves OS 132 from computer readable storage medium 130 and loads it into system memory 110. As described in more detail below, boot firmware 142 includes PCIe bus allocation firmware 144, which may be executed during POST to allocate PCIe bus resources to PCIe slots 124 and 126 according to a selected PCIe bus resource allocation option setting. In some IHS configurations, integrated PCIe devices within host processor(s) 102 and/or PCH 112, as well as PCIe end devices that are mounted to the system motherboard, may share the PCIe bus resources that are allocated to the PCIe slots 124, 126 by the PCIe bus allocation firmware 144.

During POST, boot firmware 142 is executed by at least one of host processor(s) 102 to detect and enumerate (i.e., assign bus numbers to) all PCIe devices included within IHS 100, so that system software (such as, e.g., the operating system, device drivers, applications, etc.) can address and access the PCIe devices. This includes PCIe root ports, PCIe switches, PCIe bridges and PCIe end devices, such as PCIe end devices 120 and 122, and any PCIe devices connected to the PCIe slots 124 and 126. In some embodiments, GPU 106, NIC 116 and/or computer readable storage medium 130 may also be detected and enumerated during POST when these devices are implemented as PCIe end devices.

Before the PCIe devices are detected and enumerated, boot firmware 142 is executed to allocate various amounts PCIe bus resources to the host processor(s) 102, PCIe end devices 120, 122 and PCIe slots 124, 126 at the start of POST. As noted above, the PCIe Specification allows a maximum of 256 bus numbers (or bus resources) to be allocated to all PCIe devices included within a system. In conventional information handling systems, the boot firmware typically allocates a small number of PCIe bus resources to core devices within the host processor, checks for the presence of PCI-to-PCI bridges in the PCIe device topology, and distributes PCIe bus resources to each PCI-to-PCI bridge (Primary Bus Number/Secondary Bus Number/Subordinate Bus Number) in the system for device enumeration depending on need. The boot firmware then distributes the remaining PCIe bus resources relatively evenly to the PCIe slots provided on the system motherboard.

However, a problem occurs in conventional information handling systems when dual-port Thunderbolt3 and other specialized PCIe cards are connected to the PCIe slots. As noted above, distributing PCIe bus resources evenly amongst the PCIe slots may not allow sufficient bus resources to be allocated to dual-port Thunderbolt3 cards and other specialized PCIe cards having, e.g., multiple PCI-to-PCI bridge devices on a single card or a complex hardware design. Since these PCIe cards require more bus resources (e.g., dual-port Thunderbolt3 card requires a minimum of 65 bus resources) than typical PCIe cards, they often fail to operate properly when bus resources are allocated evenly among the PCIe slots.

To overcome this problem, the present disclosure provides embodiments of an improved information handling system (IHS) and method to allocate PCIe bus resources to a plurality of PCIe slots according to a selected PCIe bus resource allocation option setting. One embodiment of such an information handling system 100 is shown in FIG. 2. Each time IHS 100 is booted, boot firmware 142 is executed by at least one of the host processor(s) 102 to initialize IHS hardware components and begin POST. At the start of POST, the host processor 102 executes PCIe bus allocation firmware 144 to allocate PCIe bus resources to a plurality of PCIe slots according to a selected PCIe bus resource allocation option setting. Unlike the conventional solution mentioned above, PCIe bus allocation firmware 144 enables PCIe bus resources to be allocated according to an "Auto Detect" option (provided, e.g., in a BIOS setup menu), which if selected, automatically detects unused PCIe slots and reallocates bus resources to used PCIe slots prior to bus enumeration.

Figure 3:
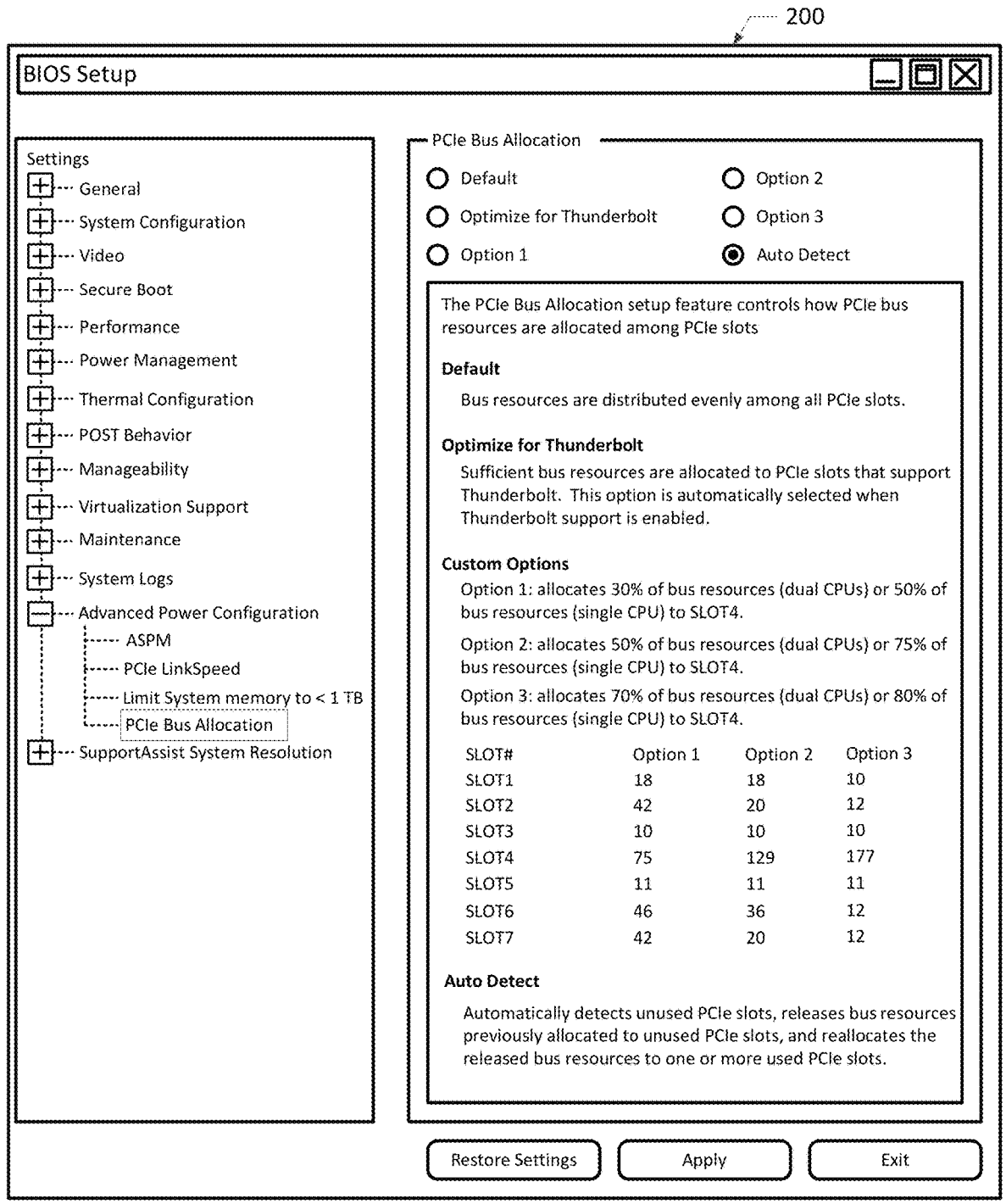
FIG. 3 is a graphical diagram of a BIOS setup menu including a plurality of PCIe bus allocation options for use in allocating PCIe bus resources to the plurality of PCIe slots.

FIG. 3 illustrates one embodiment of a BIOS setup menu 200, which enables users to view, change and restore various information handling system settings. As shown in FIG. 3, BIOS setup menu 200 includes a PCIe bus allocation setting (under the Advanced configurations setting), which enables a user to control how PCIe bus resources are allocated among PCIe slots (such as PCIe slots 124 and 126 shown in FIG. 2).

Like the conventional solution described above, BIOS setup menu 200 provides a number of user-selectable PCIe bus allocation options, including a "Default" option, an "Optimize for Thunderbolt" option, and a plurality of "Custom" options. If the Default option is selected, boot firmware 142 and/or PCIe bus allocation firmware 144 will allocate bus resources relatively evenly among all PCIe slots at the start of POST. If the "Optimize for Thunderbolt" option is selected, boot firmware 142 and/or PCIe bus allocation firmware 144 will allocate more than 65 bus resources to each PCIe slot configured to support Thunderbolt™, and allocate the remaining bus resources evenly to the remaining PCIe slots. If a "Custom" option is selected, boot firmware 142 and/or PCIe bus allocation firmware 144 will allocate a predetermined percentage of bus resources to one or more PCIe slots, while maintaining a minimum or moderate number of bus resources to the remaining PCIe slots.

Unlike the conventional solution described above, BIOS setup menu 200 provides an "Auto Detect" option that, when selected, enables boot firmware 142 and/or PCIe bus allocation firmware 144 to automatically detect unused PCIe slots (i.e., PCIe slots that are not connected to PCIe cards), release bus resources previously allocated to the unused PCIe slots, and reallocate the released bus resources to one or more of the PCIe slots currently in use (i.e., PCIe slots having PCIe cards connected thereto). Selecting the "Auto Detect" option in BIOS setup menu 200 enables PCIe bus resources to be utilized optimally by allocating more bus resources to used PCIe slots when one or more of the PCIe slots on the system motherboard are unused.

In some embodiments, the released bus resources may be reallocated evenly to all used PCIe slots when the "Auto Detect" option is selected. In some embodiments, selecting the "Auto Detect" option may reallocate the released bus resources evenly to all used PCIe slots having a larger lane width (such as, e.g., all used x16 slots), while maintaining a minimum or moderate amount bus resources to used PCIe slots having a comparatively smaller lane width (such as, e.g., used x8 and/or x4 slots). In some embodiments, a small portion of the bus resources (e.g., 2-12 buses) are maintained for the unused PCIe slot(s), when the "Auto Detect" option is selected, so that the unused PCIe slot(s) can still be addressed. In some cases, the number of PCIe bus resources maintained for unused PCIe slot(s) may be selected to meet a hardware limitation associated with host processor(s) 102. For example, a particular number of PCIe bus resources may be assigned to unused PCIe slot(s) coupled to the host processor(s) 102 to ensure that the total number of PCIe bus resources allocated to each host processor is a multiple of 32.

Figure 4:
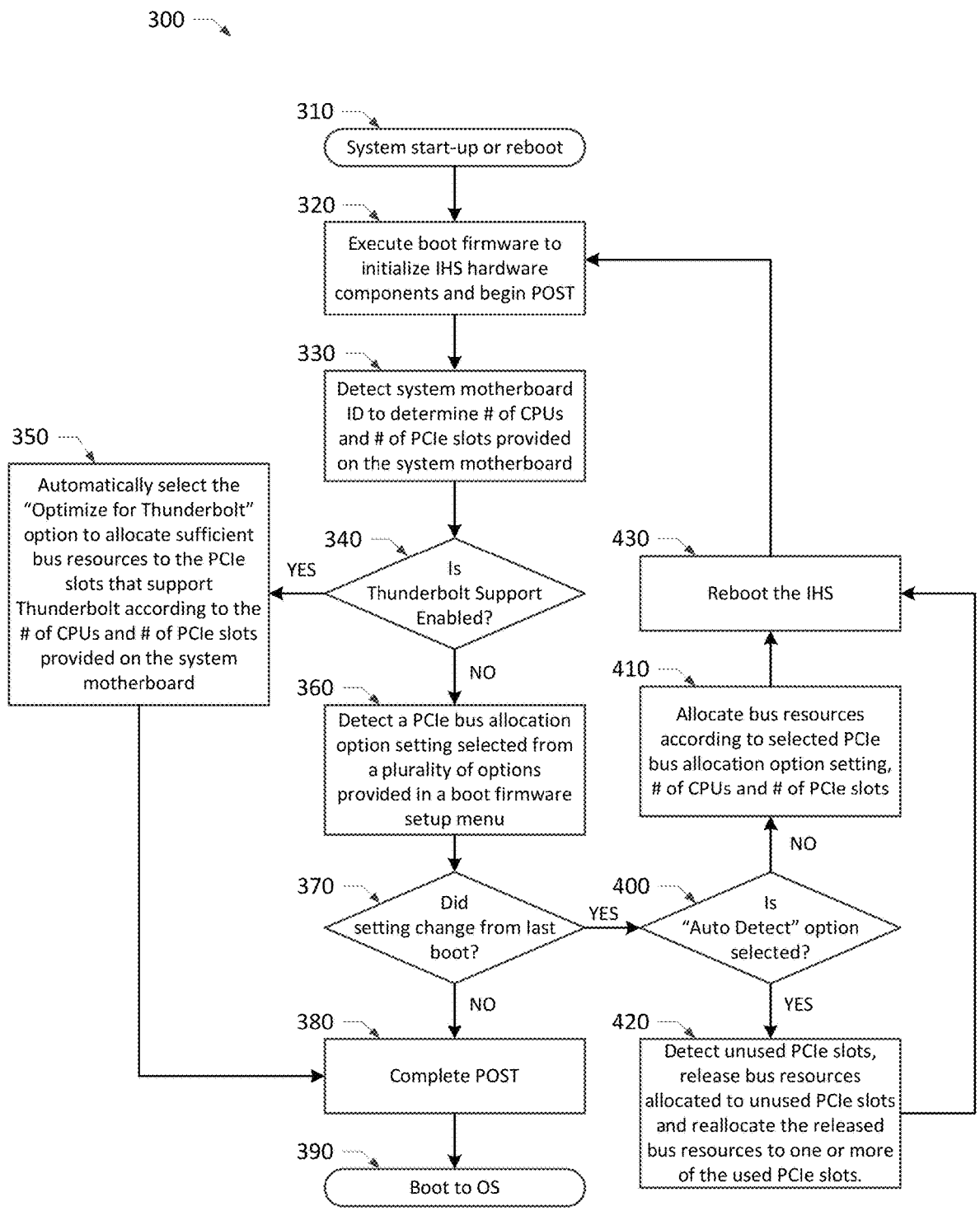
FIG. 4 is a flowchart diagram illustrating one embodiment of a method to allocate PCIe bus resources to a plurality of PCIe slots according to a selected PCIe bus allocation option setting.

FIG. 4 illustrates one embodiment of a method 300 that may be performed by at least one processing device of an information handling system (IHS) during an IHS boot process to allocate PCIe bus resources to a plurality of PCIe slots according to a selected PCIe bus resource allocation option setting. In one embodiment, at least one of the host processor(s) 102 shown in FIG. 2 may execute program instructions within boot firmware 142 and/or PCIe bus allocation firmware 144 to perform the method steps shown in FIG. 4. It is noted, however, that method 300 not strictly limited to such an embodiment, and can be implemented by another IHS processing device (e.g., an embedded controller, microcontroller, or another processing device of an IHS) executing other program instructions, in other embodiments.

The method shown in FIG. 4 is a computer implemented method 300, which may be performed by hardware, software and/or firmware components of an information handling system. In one respect, the computer implemented method 300 shown in FIG. 4 improves how an information handling system functions by automatically detecting unused PCIe slots, releasing bus resources previously allocated to the unused PCIe slots, and reallocating the released bus resources to used PCIe slot(s) when the "Auto Detect" option in the BIOS setup menu 200 shown in FIG. 3 is selected. In doing so, computer implemented method 300 optimizes the use of PCIe bus resources even when one or more of the PCIe slots on the system motherboard is/are unused. In addition, computer implemented method 300 ensures that Thunderbolt3 cards and other specialized PCIe cards have sufficient bus resources to operate properly (by providing support for the "Optimize for Thunderbolt" option in BIOS setup menu 200), and provides flexibility to the user for various scenarios and usage of the PCIe slots (by providing support for "Custom" options in BIOS setup menu 200).

According to one embodiment, method 300 may generally begin when an information handling system (e.g., IHS 100 of FIG. 2) is powered on or rebooted to begin an IHS boot process. When an IHS is powered on or rebooted (in step 310), an IHS processing device (e.g., host processor 102) may execute program instructions within boot firmware (e.g., boot firmware 142) to initialize IHS hardware components and begin a Power-On Self-Test (POST) process to ensure the hardware configuration is valid and working properly, and discover and initialize devices (in step 320). At the start of POST, the IHS processing device may execute program instructions within PCIe bus allocation firmware (e.g., PCIe bus allocation firmware 144) to allocate PCIe bus resources to a plurality of PCIe slots provided on a system motherboard of the IHS, where allocation is performed according to a selected PCIe bus resource allocation option selected (selected, e.g., from within BIOS setup menu 200). In some embodiments, program instructions within the PCIe bus allocation firmware may be executed to perform method steps 330-370 and method steps 400-430.

In step 330, method 300 determines the number of host processors and the number of PCIe slots provided on the system motherboard. Some information handling systems, for example, may have only one host processor (e.g., one CPU) installed in the system, while other systems may have two (or more). Likewise, some information handling systems may have only two PCIe slots, while other systems may have substantially more (e.g., 3, 4, 5 . . . 7, etc.) PCIe slots. In some embodiments, method 300 may detect a system motherboard ID and may use the system motherboard ID to determine how many host processors and PCIe slots are provided on the system motherboard (in step 330). In one example embodiment, the system motherboard ID may be hardwired on the system motherboard and may be detected by the boot firmware by reading a value from GPIO pins on PCH 112. In some embodiments, the system motherboard ID may also be used (in step 330) to determine the lane width (e.g., 1, 2, 4, 8, 12, or 16) of each PCIe slot included on the system motherboard. In some embodiments, method 300 may use the number of host processors, the number of PCIe slots and/or the lane width of the PCIe slots to determine how PCIe bus resources should be allocated to one or more of the PCIe slots (in steps 350, 410 and 420), as described in more detail below.

In step 340, method 300 checks to see if Thunderbolt™ support is enabled for the information handling system. In one example, the method may determine if Thunderbolt™ support is enabled by checking a BIOS variable. When Thunderbolt™ support is enabled (YES branch of step 340), the "Optimize for Thunderbolt" option is automatically selected (in step 350), and all other PCIe bus allocation options (e.g., Default, Auto Detect and Custom Options 1, 2, 3) are rendered unavailable for user selection in the BIOS setup menu 200 shown in FIG. 3. By selecting the "Optimize for Thunderbolt" option, method 300 ensures that sufficient bus resources (e.g., 65 bus resources or more) will be allocated to the PCIe slots that support Thunderbolt™ (in step 350).

In some embodiments, method step 350 may use the system motherboard ID detected in step 330 to determine how PCIe bus resources should be allocated to the PCIe slots. For example, method step 350 may allocate a minimum of 65 bus resources to PCIe slots that support Thunderbolt™, and may allocate remaining bus resources to the remaining PCIe slots, based on the number of host processors included in the IHS and the number of PCIe slots provided on the system motherboard. In some embodiments, method step 350 may also use the lane width of the PCIe slots to determine how PCIe bus resources should be allocated. For example, more bus resources may be allocated to PCIe slots with greater lane widths, while fewer bus resources are allocated to PCIe slots with comparatively smaller lane widths. Once PCIe bus resources are allocated in step 350, method 300 may complete the POST process (in step 380) and boot the OS (in step 390). In some embodiments, host processor 102 may execute program instructions within boot firmware 142 to perform method steps 380 and 390.

When Thunderbolt™ support is disabled (NO branch of step 340), method step 360 detects a PCIe bus allocation option setting selected from a plurality of options provided in a boot firmware setup menu (e.g., BIOS setup menu 200 of FIG. 3). Next, the method determines if the setting has changed from the last system boot (in step 370). If the setting did not change (NO branch of step 370), method 300 completes POST (in step 380) and boots the OS (in step 390). However, if method 300 determines that the PCIe bus allocation option setting has changed since the last system boot (YES branch of step 370), the method determines whether or not the "Auto Detect" option has been selected (in step 400) in the BIOS setup menu 200 shown in FIG. 3.

If the "Auto Detect" option is not selected (NO branch of step 400), method 300 allocates PCIe bus resources to the PCIe slots according to the PCIe bus allocation option setting (e.g., Default, Custom Option 1, Custom Option 2, or Custom Option 3) selected in the BIOS setup menu 200 shown in FIG. 3 (in step 410). In some embodiments, method 300 may use the system motherboard ID (detected in step 330), and more specifically, the number of host processors, the number of PCIe slots and/or the lane width of the PCIe slots to determine how the PCIe bus resources should be allocated to the PCIe slots (in step 410).

If the "Default" option is selected, method 300 allocates PCIe bus resources relatively evenly to all PCIe slots (in step 410), where the number of bus resources allocated to each PCIe slot is based, at least in part, on the number of host processors and the number of PCIe slots provided on the system motherboard. Although PCIe bus resources are distributed relatively evenly amongst PCIe slots when the "Default" option is selected, lane width may also be taken into consideration, such that more bus resources are allocated to PCIe slots with greater lane widths, while fewer bus resources are allocated to PCIe slots with comparatively smaller lane widths.

If a "Custom" option is selected, method 300 allocates a predetermined percentage of PCIe bus resources to one or more of the PCIe slots, while maintaining a minimum or moderate number of PCIe bus resources to the remaining PCIe slots (in step 410). As before, the number of PCIe bus resources allocated to each PCIe slot may be based, at least in part, on the number of host processors and the number of PCIe slots provided on the system motherboard. For example, if Custom Option 1 is selected, method 300 may allocate approximately 50% of all PCIe bus resources to one PCIe slot (if one host processor is installed), or approximately 30% of all PCIe bus resources to the PCIe slot (if two host processors are installed), while allocating a moderate number of PCIe bus resources to the remaining PCIe slots. If Custom Option 2 is selected, method 300 may allocate approximately 75% of all PCIe bus resources to one PCIe slot (if one host processor is installed), or approximately 50% of all PCIe bus resources to the PCIe slot (if two host processors are installed), while allocating a minimum or moderate number of PCIe bus resources to the remaining PCIe slots. If Custom Option 3 is selected, method 300 may allocate approximately 80% of all PCIe bus resources to one PCIe slot (if one host processor is installed), or approximately 70% of all PCIe bus resources to the PCIe slot (if two host processors are installed), while allocating a minimum number of PCIe bus resources to the remaining PCIe slots. In some embodiments, lane width may also be taken into consideration when allocating PCIe bus resources to the remaining PCIe slots, such that more bus resources are allocated to PCIe slots with greater lane widths, while fewer bus resources are allocated to PCIe slots with comparatively smaller lane widths.

Figure 5:
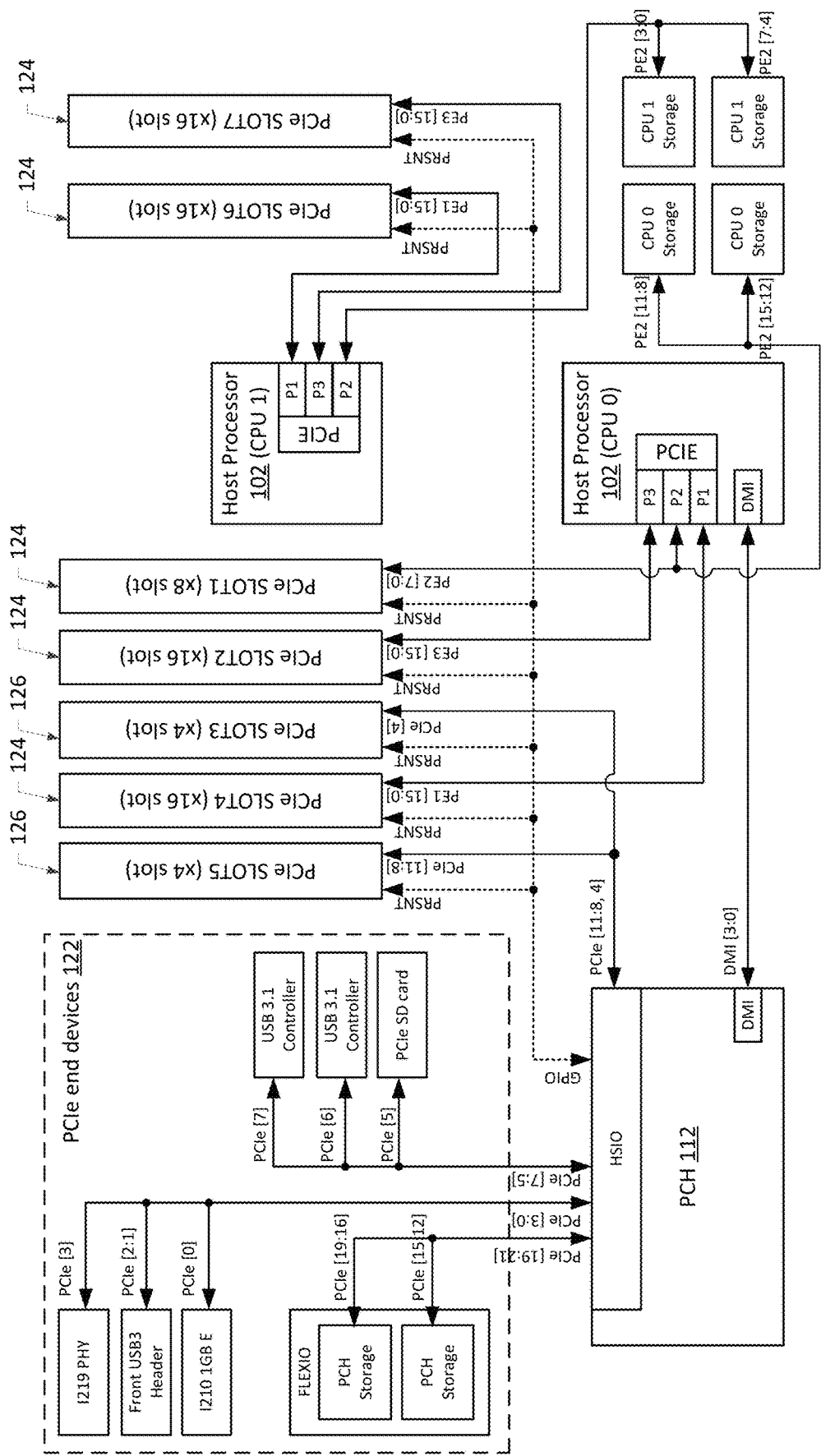
FIG. 5 is block diagram illustrating an example implementation of a portion of the IHS components shown in FIG. 2, including two host processors, a platform controller hub (PCH), a plurality of PCIe end devices and a plurality of PCIe slots.

If the "Auto Detect" option is selected (YES branch of step 400), method 300 automatically detects which of the plurality of PCIe slots are used and unused, releases bus resources previously allocated to the unused PCIe slots, and reallocates the released bus resources to one or more of the PCIe slots currently in use (in step 420). In some embodiments, method step 420 may detect unused PCIe slots by checking for "device presence" at each PCIe slot. As shown in FIG. 5, for example, general purpose I/O (GPIO) pins on PCH 112 may be connected to PRSNT pins on the PCIe slots (e.g., PCIe SLOT1 . . . 7) to determine if PCIe devices are connected to the slots. To check for "device presence," boot firmware 142 reads the voltage value on those GPIO pins to determine if PCIe devices are connected to the PCIe slots. If a "device present" signal (voltage value) is read from a GPIO pin connected to a PRSNT pin on a PCIe slot, method step 420 detects a PCIe device connected to the PCIe slot and determines that the PCIe slot is "used." Conversely, method step 420 may determine that a PCIe slot is "unused," if a "device present" signal (voltage value) is not read from the GPIO pin.

If all of the PCIe slots on the motherboard are currently in use, method step 420 may allocate PCIe bus resources relatively evenly to all PCIe slots, where the number of bus resources allocated to each PCIe slot is based, at least in part, on the number of host processors and the number of PCIe slots provided on the system motherboard. In some embodiments, lane width may also be taken into consideration when allocating PCIe bus resources to the PCIe slots, such that more bus resources are allocated to PCIe slots with greater lane widths, while fewer bus resources are allocated to PCIe slots with comparatively smaller lane widths.

If method step 420 determines that one or more of the PCIe slots on the system motherboard are "unused," the bus resources previously allocated to the unused PCIe slots are released and reallocated to one or more of the PCIe slots currently in use (in step 420). The number of released bus resources reallocated to the used PCIe slots may be based, at least in part, on the number of host processors, the number of used/unused PCIe slots and/or the lane width of the used/unused PCIe slots. For example, if one PCIe slot is determined to be "unused" in a dual processor system (see, e.g., FIG. 6), method step 420 releases the bus resources previously allocated to the one unused PCIe slot, and reallocates the released bus resources to one or more of the used PCIe slots. If two PCIe slots are determined to be "unused" in a dual processor system (see, e.g., FIGS. 7 and 8), method step 420 releases the bus resources previously allocated to the two unused PCIe slots, and reallocates the released bus resources to one or more of the used PCIe slots.

In some embodiments, method step 420 may reallocate the released bus resources relatively evenly to all PCIe slots currently in use. In other embodiments, lane width may be taken into consideration when reallocating the released bus resources to the used PCIe slots. For example, method step 420 may reallocate the released bus resources relatively evenly to the used PCIe slots having a larger lane width (such as, e.g., used x16 PCIe slots), while maintaining a minimum or moderate amount of bus resources for the used PCIe slots having a comparatively smaller lane width (such as, e.g., used x8 or x4 PCIe slots). As noted above, a small portion of the released bus resources (e.g., 2-12 buses) are maintained for the unused PCIe slot(s) (in step 420) so that the unused PCIe slot(s) can still be addressed. In some embodiments, the number of PCIe bus resources maintained for unused PCIe slot(s) may be selected to meet a hardware limitation associated with the host processors. For example, a particular number of PCIe bus resources (e.g., a number between approximately 2 and 12 buses) may be assigned to unused PCIe slot(s) coupled to the host processors to ensure that the total number of PCIe bus resources allocated to each host processor is a multiple of 32.

Once PCIe bus resources are allocated (in steps 410 and 420), method 300 reboots the information handling system (in step 430) so that the bus allocation changes can take effect before returning to method step 320.

FIG. 5 provides an example implementation of a portion of the IHS components shown in FIG. 2, including host processors 102, PCH 112, PCIe end devices 122 and PCIe slots 124 and 126. In the example shown in FIG. 5, IHS 100 includes two host processors 102 (CPU0, CPU1) and seven PCIe slots (PCIe SLOT1 . . . 7), including four x16 slots (PCIe SLOT2, SLOT4, SLOT6 and SLOT7), one x8 slot (PCIe SLOT1) and two x4 slots (PCIe SLOT3, SLOT5). The first host processor (CPU0) is connected, via PCIe links, to PCIe SLOT1, PCIe SLOT2 and PCIe SLOT4, while the second host processor (CPU1) is connected, via PCIe links, to PCIe SLOT6 and PCIe SLOT7. The host processors 102 are additionally connected, via PCIe links, to CPU0 storage and CPU1 storage. When coupled in such a manner, CPU0 storage and CPU1 storage may be considered to be PCIe end devices for the host processors 102.

Although not limited to such, PCH 112 may include a High Speed I/O (HSIO) interface, a Direct Media Interface (DMI) and a number of General Purpose Input/Output (GPIO) pins, as shown in FIG. 5. The HSIO interface included within PCH 112 enables high speed I/O signals to be configured as PCIe, SATA, 6 Gb/s or USB 3.1. In the illustrated embodiment, PCH 112 communicates with PCIe end devices 122 and PCIe SLOT3 and PCIe SLOT5 via the PCIe links coupled to the HSIO interface, and communicates with CPU0 via the DMI. Although not strictly limited to such, PCIe end devices 122 may include a PCIe SD card, a front USB3 header (i.e., a PCIe USB controller to convert PCIe interface to USB3.0), one or more USB 3.1 controllers, FLEXIO (containing PCH storage, such as PCIe-compatible non-volatile memory), and one or more NICs (e.g., I219 PHY and/or I210 1 GB Ethernet controllers), as shown in FIG. 5.

As noted above, GPIO pins of PCH 112 may be connected to present (PRSNT) pins on each of the PCIe slots (PCIe SLOT1 . . . 7) for checking for "device presence" and detecting used/unused PCIe slots (in step 420 of method 300). For example, method step 420 may determine that a PCIe end device is connected to a PCIe slot (i.e., the PCIe slot is "used"), if a "device present" signal (voltage value) is detected via a GPIO pin of PCH 112 and a PRSNT pin on the PCIe slot, or may determine that the PCIe slot is "unused," if no "device present" signal (voltage value) is detected.

It is noted that the particular implementation and configuration shown in FIG. 5 is only one example, which is provided to help illustrate the patentable concepts disclosed herein. The improved information handling system and method described herein is not strictly limited to any particular number and/or type of host processors, PCIe end devices or PCIe slots, and may include a different number and/or type of host processors, PCIe end devices and/or PCIe slots than is expressly shown in FIG. 5. In one particular implementation, the PCIe bus allocation firmware 144 and PCIe bus allocation method 300 disclosed herein may be adopted within information handling systems comprising Intel server CPUs, such as Skylake server CPUs, Cascade Lake CPUs, Cooper Lake CPUs, Ice Lake CPUs, etc. It is further noted that the PCIe slots shown in FIG. 5 are not limited to any particular number or lane width, and may include an alternative number and/or combination of lane widths in other embodiments. It is additionally noted that the manner in which PCIe slots 124 and 126 and PCIe end devices 122 are connected to host processors 102 and PCH 112 via PCIe links may differ from that shown in FIG. 5.

FIG. 6 is a table illustrating a first PCIe bus resource allocation scheme in accordance with the present disclosure. In particular, the table shown in FIG. 6 provides an example "Default" PCIe bus allocation for the IHS configuration shown in FIG. 5, and illustrates how PCIe bus resources may be reallocated if the "Auto Detect" option is selected (in method step 400) and one of the x16 PCIe slots (PCIe SLOT2, PCIe SLOT4, PCIe SLOT6 or PCIe SLOT7) is determined to be "unused" (in method step 420). In the example PCIe bus resource allocation scheme shown in FIG. 6, if one of the x16 PCIe slots is determined to be "unused," the majority of the bus resources previously allocated to the unused x16 PCIe slot are released and reallocated relatively evenly to all x16 PCIe slots currently in use.

For example, if x16 PCIe SLOT4 is determined to be "unused," the majority (44) of the bus resources previously allocated to the unused x16 PCIe slot (46) are released and reallocated, such that x16 PCIe SLOT2 receives an additional 12 bus resources (for a total of 58), x16 PCIe SLOT6 receives an additional 16 bus resources (for a total of 60), and x16 PCIe SLOT7 receives an additional 16 bus resources (for a total of 60). In the first PCIe bus resource allocation scheme, the released bus resources are reallocated only to the used x16 PCIe slots, and no bus resources are reallocated to the x8 or x4 PCIe slots (PCIe SLOT1, PCIe SLOT3 and PCIe SLOT5) shown in FIG. 5. A similar bus resource allocation scheme may be used when PCIe SLOT2, PCIe SLOT 6 or PCIe SLOT7 is determined to be "unused," as shown in FIG. 6.

FIG. 7 is a table illustrating a second PCIe bus resource allocation scheme in accordance with the present disclosure. In particular, the table shown in FIG. 7 provides an example "Default" PCIe bus allocation for the IHS configuration shown in FIG. 5, and illustrates how PCIe bus resources may be reallocated if the "Auto Detect" option is selected (in method step 400) and two of the x16 PCIe slots (PCIe SLOT2, PCIe SLOT4, PCIe SLOT6 or PCIe SLOT7) are determined to be "unused" (in method step 420). In the example PCIe bus resource allocation scheme shown in FIG. 7, if two of the x16 PCIe slots are determined to be "unused," the majority of the bus resources previously allocated to the unused x16 PCIe slots are released and reallocated relatively evenly to all x16 PCIe slots currently in use.

For example, if x16 PCIe SLOTS 4 and 6 are determined to be "unused," the majority (86) of the bus resources previously allocated to the unused x16 PCIe slots (90) are released and reallocated, such that x16 PCIe SLOT2 receives an additional 44 bus resources (for a total of 90) and x16 PCIe SLOT7 receives an additional 42 bus resources (for a total of 86). In the second PCIe bus resource allocation scheme, the released bus resources are reallocated only to the used x16 PCIe slots, and no bus resources are reallocated to the x8 or x4 PCIe slots (PCIe SLOT1, PCIe SLOT3 and PCIe SLOT5) shown in FIG. 5. A similar bus resource allocation scheme may be used when PCIe SLOTS 4 and 7, PCIe SLOTS 2 and 6, or PCIe SLOTS 2 and 7 are determined to be "unused," as shown in FIG. 7.

FIG. 8 is a table illustrating a third PCIe bus resource allocation scheme in accordance with the present disclosure. In particular, the table shown in FIG. 8 provides an example "Default" PCIe bus allocation for the IHS configuration shown in FIG. 5, and illustrates how PCIe bus resources may be reallocated if the "Auto Detect" option is selected (in method step 400) and all x16 PCIe slots connected to one of the host processors 102 (i.e., CPU0 or CPU1) are determined to be "unused" (in method step 420). In the example PCIe bus resource allocation scheme shown in FIG. 8, if all x16 PCIe slots connected to one of the host processors 102 (i.e., all x16 slots connected to CPU0, or all x16 slots connected to CPU1) are determined to be "unused," the majority of the bus resources previously allocated to the unused x16 PCIe slots are released and reallocated to all PCIe slots currently in use, regardless of lane width.

For example, if the x16 PCIe SLOTS 2 and 4 connected to CPU0 are determined to be "unused," the majority (86) of the bus resources previously allocated to the unused x16 PCIe slots (92) are released and reallocated, such that the x16 PCIe SLOTS 6 and 7 connected to CPU1 each receive an additional 32 bus resources (for a total of 76 bus resources each), the x8 PCIe SLOT1 connected to CPU0 receives an additional 12 bus resources (for a total of 58), and the x4 PCIe SLOTS 3 and 5 connected to PCH 112 receive an additional 12 bus resources (for a total of 34 bus resources combined). A similar bus resource allocation scheme may be used when the x16 PCIe SLOTS 6 and 7 connected to CPU1 are determined to be "unused," as shown in FIG. 8.

It is noted that the PCIe bus resource allocation schemes shown in FIGS. 6-8 are examples provided to help illustrate the patentable concepts disclosed herein. It is further noted that the improved information handling system and method described herein are not strictly limited to the PCIe bus resource allocation schemes explicitly shown in FIGS. 6-8 and described herein. For example, instead of reallocating released bus resources evenly to only x16 slots, as shown in FIGS. 6 and 7, alternative embodiments of the PCIe bus allocation schemes shown in FIGS. 6 and 7 may reallocate the released bus resources to all PCIe slots currently in use (including x16, x8 and x4 slots). In some embodiments, the bus resources originally allocated to the x8 and x4 slots shown in FIG. 5 (e.g., PCIe SLOTS 1, 3 and 5) may also be reallocated in accordance with the method shown in FIG. 4, if the "Auto Detect" option is selected (in method step 400) and one or more of these slots is/are determined to be "unused" (in method step 420).

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device. In one embodiment, for example, the method shown in FIG. 4 may be implemented as boot firmware 142 and/or PCIe bus allocation firmware 144 or other computer program instructions, which are stored within computer readable NV memory 140 and executed by at least one host processor 102 of information handling system 100.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A computer-implemented method executed by a host processor of an information handling system (IHS) having a plurality of Peripheral Component Interconnect Express (PCIe) slots provided on a system motherboard, wherein the computer-implemented method is performed each time the IHS is booted at the start of a Power-On Self-Test (POST), and wherein the computer-implemented method comprises:
   detecting a PCIe bus allocation option setting selected from a plurality of options provided in a boot firmware setup menu, wherein said plurality of options comprise at least an auto detect option; and
   determining whether or not the PCIe bus allocation option setting has changed since the IHS was last booted;
   wherein when the PCIe bus allocation option setting has changed since the last boot and the auto detect option is detected, the method further comprises:
      automatically detecting which of the plurality of PCIe slots are used and unused;
      releasing PCIe bus resources previously allocated to any PCIe slots determined to be unused; and
      reallocating the released PCIe bus resources to one or more of the PCIe slots determined to be used.

2. The computer-implemented method as recited in claim 1, wherein said automatically detecting which of the plurality of PCIe slots are used and unused comprises:
   determining that a PCIe slot is used upon detecting a device present signal supplied from a pin on the PCIe slot; and
   determining that the PCIe slot is unused if no device present signal is detected from the pin on the PCIe slot.

3. The computer-implemented method as recited in claim 1, wherein if said automatically detecting determines that each of the plurality of PCIe slots on the system motherboard are used, the method further comprises allocating PCIe bus resources relatively evenly to the plurality of PCIe slots.

4. The computer-implemented method as recited in claim 1, wherein if said automatically detecting determines that one or more of the plurality of PCIe slots are unused, said reallocating comprises reallocating the released PCIe bus resources to one or more of the used PCIe slots based, at least in part, on at least one of: a number of the host processors included within the IHS, a number of the PCIe slots provided on the system motherboard and a lane width of the PCIe slots.

5. The computer-implemented method as recited in claim 4, further comprising determining at least one of: the number of host processors included within the IHS, the number of PCIe slots provided on the system motherboard and the lane width of the PCIe slots prior to said reallocating.

6. The computer-implemented method as recited in claim 4, further comprising detecting the system motherboard ID to determine the number of host processors included within the IHS, the number of PCIe slots provided on the system motherboard and the lane width of the PCIe slots prior to said reallocating.

7. The computer-implemented method as recited in claim 4, wherein if said automatically detecting determines that one or more of the plurality of PCIe slots are unused, said reallocating comprises:
   reallocating the released PCIe bus resources relatively evenly to only the used PCIe slots having a larger lane width.

8. The computer-implemented method as recited in claim 4, wherein if said automatically detecting determines that one or more of the plurality of PCIe slots are unused, said reallocating comprises:
   reallocating a larger amount of the released PCIe bus resources relatively evenly to the used PCIe slots having a larger lane width; and
   reallocating a smaller amount of the released PCIe bus resources to the used PCIe slots having a comparatively smaller lane width.

9. The computer-implemented method as recited in claim 1, wherein said plurality of options further comprises one or more of: a default option, an optimize for Thunderbolt option, and one or more custom options.

10. The computer-implemented method as recited in claim 9, further comprising determining if Thunderbolt support is enabled for the IHS prior to said detecting a PCIe bus allocation option setting.

11. The computer-implemented method as recited in claim 10, wherein if Thunderbolt support is enabled, the method further comprises:
   automatically selecting the optimize for Thunderbolt option and rendering the default option, the auto detect option and the one or more custom options unavailable for user selection in the boot firmware setup menu;

allocating sufficient PCIe bus resources to the PCIe slots that support Thunderbolt; and
allocating remaining PCIe bus resources to the other PCIe slots based, at least in part, on at least one of: a number of the host processors included in the system, a number of the PCIe slots provided on the system motherboard and a lane width of the PCIe slots.

12. The computer-implemented method as recited in claim 10, wherein if Thunderbolt support is disabled, the PCIe bus allocation option setting has changed since the last boot and the auto detect option is not detected, the method further comprises:
allocating PCIe bus resources to the PCIe slots according to the detected PCIe bus allocation option setting, wherein said allocation is based, at least in part, on at least one of: a number of the host processors included within the IHS, a number of the PCIe slots provided on the system motherboard and a lane width of the PCIe slots.

13. An information handling system (IHS), comprising:
a plurality of Peripheral Component Interconnect Express (PCIe) slots provided on a system motherboard, wherein each PCIe slot is configured to connect to a PCIe end device;
at least one host processor coupled to one or more of the PCIe slots, wherein the at least one host processor is configured to execute:
a first set of program instructions to detect a PCIe bus allocation option setting selected from a plurality of options provided in a boot firmware setup menu, wherein said plurality of options comprise at least an auto detect option, which when selected, enables the at least one host processor to automatically detect unused PCIe slots and reallocate PCIe bus resources to used PCIe slots;
a second set of program instructions to determine whether or not the PCIe bus allocation option setting has changed since the IHS was last booted; and
a third set of program instructions to allocate PCIe bus resources to the plurality of PCIe slots according to the detected PCIe bus allocation option setting.

14. The information handling system as recited in claim 13, wherein if the PCIe bus allocation option setting has changed since the last boot and the auto detect option is detected, the third set of program instructions are executed by the host processor to:
automatically detect which of the plurality of PCIe slots are used and unused;
release PCIe bus resources previously allocated to any PCIe slots determined to be unused; and
reallocate the released PCIe bus resources to one or more of the PCIe slots determined to be used.

15. The information handling system as recited in claim 14, further comprising a platform controller hub (PCH) coupled to the PCIe slots and to the at least one host processor, wherein the PCH comprises a plurality of general purpose input/output (GPIO) pins that are coupled to present pins on the PCIe slots, and wherein the third set of program instructions are executed to:
determine that a particular PCIe slot is used, if a device present signal is detected via a GPIO pin of the PCH and a present pin of the particular PCIe slot; and
determine that the particular PCIe slot is unused, if no device present signal is detected.

16. The information handling system as recited in claim 14, wherein if one or more of the PCIe slots are determined to be unused, the third set of program instructions are executed by the host processor to reallocate the released PCIe bus resources to one or more of the used PCIe slots based, at least in part, on at least one of: a number of the host processors included within the IHS, a number of the PCIe slots provided on the system motherboard and a lane width of the PCIe slots.

17. The information handling system as recited in claim 16, wherein if one or more of the PCIe slots are determined to be unused, the third set of program instructions are executed by the host processor to:
reallocate the released PCIe bus resources relatively evenly to only the used PCIe slots having a larger lane width.

18. The information handling system as recited in claim 16, wherein if one or more of the PCIe slots are determined to be unused, the third set of program instructions are executed by the host processor to:
reallocate a larger amount of the released PCIe bus resources relatively evenly to the used PCIe slots having a larger lane width; and
reallocate a smaller amount of the released PCIe bus resources to the used PCIe slots having a comparatively smaller lane width.

19. The information handling system as recited in claim 13, wherein said plurality of options further comprises one or more of: a default option, an optimize for Thunderbolt option, and one or more custom options.

20. The information handling system as recited in claim 19, wherein prior to executing the first set of program instructions to detect the PCIe bus allocation option setting, the at least one host processor is configured to execute a fourth set of program instructions to determine if Thunderbolt support is enabled for the IHS.

21. The information handling system as recited in claim 20, wherein if Thunderbolt support is enabled, the at least one host processor is configured to execute a fifth set of program instructions to:
automatically select the optimize for Thunderbolt option and render the default option, the auto detect option and the one or more custom options unavailable for user selection in the boot firmware setup menu;
allocate sufficient PCIe bus resources to the PCIe slots that support Thunderbolt; and
allocate remaining PCIe bus resources to the other PCIe slots based, at least in part, on at least one of: a number of the host processors included in the system, a number of the PCIe slots provided on the system motherboard and a lane width of the PCIe slots.

22. The information handling system as recited in claim 20, wherein if Thunderbolt support is disabled, the PCIe bus allocation option setting has changed since the last boot and the auto detect option is not detected, the at least one host processor is configured to execute the third set of program instructions to allocate PCIe bus resources to the PCIe slots according to the detected PCIe bus allocation option setting, wherein said allocation is based, at least in part, on at least one of: a number of the host processors included within the IHS, a number of the PCIe slots provided on the system motherboard and a lane width of the PCIe slots.

* * * * *